United States Patent
Paddon et al.

(10) Patent No.: US 7,302,060 B2
(45) Date of Patent: Nov. 27, 2007

(54) METHOD AND APPLICATION FOR AUTHENTICATION OF A WIRELESS COMMUNICATION USING AN EXPIRATION MARKER

(75) Inventors: Michael Paddon, Kellyville (AU); Gregory G. Rose, Concord (AU); Philip M. Hawkes, Burwood (AU); James F. Semple, London (GB)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 10/944,225

(22) Filed: Sep. 16, 2004

(65) Prior Publication Data

US 2005/0102517 A1 May 12, 2005

Related U.S. Application Data

(60) Provisional application No. 60/519,010, filed on Nov. 10, 2003.

(51) Int. Cl.
*H04L 9/00* (2006.01)
(52) U.S. Cl. .............. 380/270; 380/247; 380/287; 455/411
(58) Field of Classification Search .......... 380/270
See application file for complete search history.

(56) References Cited

U.S. PATENT DOCUMENTS

2002/0012433 A1* 1/2002 Haverinen et al. ......... 380/247
2003/0070092 A1* 4/2003 Hawkes et al. ............ 713/201
2004/0078571 A1* 4/2004 Haverinen ................. 713/168

FOREIGN PATENT DOCUMENTS

EP 1005244 A1 11/1998
WO 01/89253 A1 11/2001

OTHER PUBLICATIONS

Molva et al., Authentication of Mobile Users, IEEE, Mar./Apr. 1994.*
Menezes et al., "Handbook of Applied Cryptography" *CRC Press Series on Discrete Mathematics and its Applications*, 1997, pp. 397-400, 417-419, 497-498 and 553.
"A précis of the new attacks on GSM encryption" by Greg Rose, QUALCOMM Australia, Sep. 10, 2003, pp. 1-3.
"Enhancements on GSM/UMTS AKA" Ericsson, Document for Discussion, 3GPP TSG SA WG3 Security, S3-030542, Povoa de Varzim, Portugal, Oct. 6-10, 2003, pp. 1-3.
Elad Barkan et al. "Instant Ciphertext-Only Cryptanalysis of GSM Encrypted Communication" Computer Science Department, Technion, Israel; Department of Mathematics, Technion, Israel, pp. 1-18.

* cited by examiner

*Primary Examiner*—Taghi Arani
(74) *Attorney, Agent, or Firm*—Thomas R. Rouse; Sandra L. Godsey; Kristine U. Ekwueme

(57) ABSTRACT

Systems and methods of securing wireless communications between a network and a subscriber station are disclosed. One embodiment creates authentication triplets due to expire after a certain amount of time such that they may not be used indefinitely by an attacker who intercepts them.

20 Claims, 5 Drawing Sheets

METHOD AND APPLICATION FOR AUTHENTICATION OF A WIRELESS COMMUNICATION USING AN EXPIRATION MARKER

CLAIM OF PRIORITY UNDER 35 U.S.C. §119

The present Application for Patent claims priority to Provisional Application No. 60/519,010 entitled "Expiration of GSM Authentication Challenges" filed Nov. 10, 2003, and assigned to the assignee hereof and hereby expressly incorporated by reference herein.

BACKGROUND

1. Field

The present disclosure relates generally to wireless telecommunications and, more specifically, to a method of securing wireless telecommunications systems.

2. Background

One cellular technology for wireless communications is defined by the Global System for Mobile (GSM) protocol. GSM has been further extended by new services, such as General Packet Radio Service (GPRS), which offers Internet content and packet-based data services for GSM networks. GSM is used for many types of wireless communications including voice, Internet browsing, e-mail and multimedia data. GSM incorporates various security mechanisms to protect the content communicated over such systems. Service providers and users alike rely on these security mechanisms for the privacy of their communications and protection of their data. The security mechanisms typically operate by authenticating users to the network, then user encrypting data before transmission over the air. Such security measures are subject to attack by third parties. There is a need therefore, for a method and apparatus for secure wireless communications.

DETAILED DESCRIPTION

Figure 1:
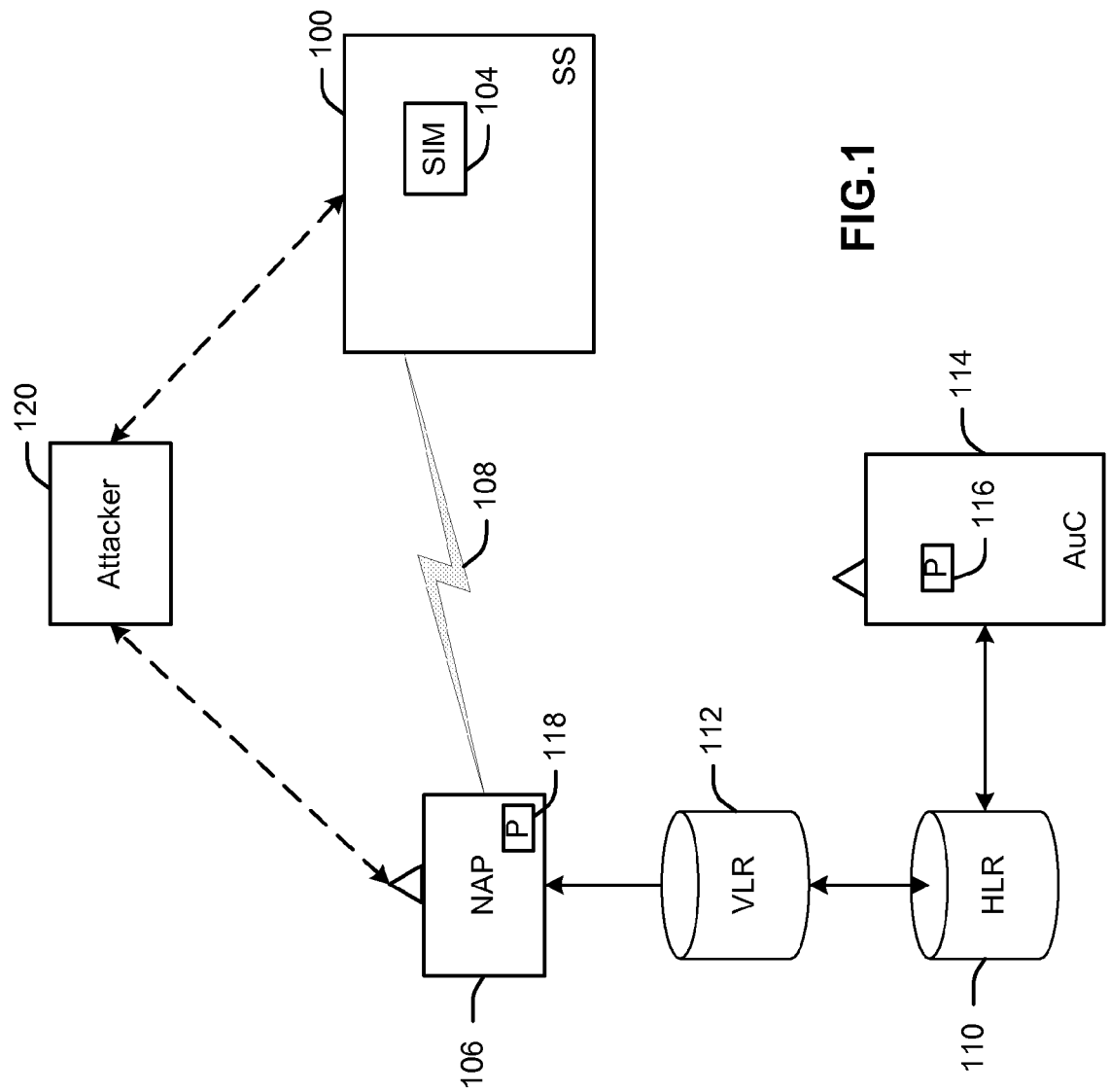
FIG. 1 illustrates a portion of a typical GSM network system that may be compromised by an attacker.

Encryption is a process of modifying data for protection against access by a non-authorized third party. This technique generally employs ciphering of data transmitted over an air interface, e.g., between subscriber stations and base stations, as well as over other wireless or wireline links, to a desired remote party. Ciphering refers in general to encoding data in such a way that only the recipient with the proper "key" can decode it. Ciphering may be achieved, for example, by performing an exclusive-OR operation between a pseudo-random bit sequence and the bits of a normal burst of communications data. Only when a recipient has the proper key may the operation be "undone" and the burst of communications data extracted.

One type of encryption used in wireless communications systems is performed using a stream cipher. The encryption algorithm for stream cipher takes a secret key known only to the user's device (such as a cellular phone or specifically, a Subscriber Identity Module (SIM) card inside of a device) and a frame number, and generates a pseudo-random stream of bits (i.e., keystream) to be XORed with the input for encryption. The information is also used decrypt received data. Thus, the bits are effectively encrypted independently of one another.

Two algorithms commonly used to generate the pseudo-random sequence for use as described above are the A5/1 and A5/2 algorithms. Original GSM protocols support three levels of security for airlink encryption: unencrypted; A5/2; and A5/1 encrypted. The A5 algorithm is used for encryption optionally on voice or data connections. A5 is a stream cipher, using a 64-bit cipher key, but is block based with a block length of 228 bits. A5 is designed to be efficiently implemented in hardware, involving only XOR and one-bit addition operations. A5 has two versions: A5/1 used in Europe; and A5/2 used in export systems. Both A5/1 and A5/2 are stream-cipher algorithms used for encryption, but each provides slightly different security and incurs different complexity. As will be recognized by those skilled in the art, A5 is part of the GSM specification. A5/1 is known as the "strong" export-limited version, and A5/2 is the standard and "weak" version having no export limitations. Another version of A5 encryption sometimes used is A5/3, which is based on the block-cipher Universal Mobile Telecommunications System (UMTS)/Wideband Code Division-Multiple Access (WCDMA) algorithm known as "KASUMI." Kasumi is a 64-bit block cipher using a true 128-bit key.

Each of these algorithms uses, as the secret key, a 64-bit session key ($K_c$) derived by an authentication mechanism, such as according to a standard GSM-supported authentication mechanism. GSM security is based on a challenge-response mechanism using a secret 128-bit key ($K_i$) stored on the SIM card and on the user's home network Authentication Center (AuC). During initialization of an active session, the AuC generates a 128-bit randomly chosen value (RAND) and applies an authentication algorithm such as A3 or A8, also part of the GSM specification, to the RAND. The algorithm generates both an expected response (SRES) and an encryption key for the session (the $K_c$), each of which are functions of the RAND and the $K_i$. The RAND, SRES and $K_c$ collectively constitute a GSM Authentication Vector (authentication triplet).

During registration, the authentication triplet is issued to the base station, which forwards the RAND to the subscriber station. The SIM card in the subscriber station reads the RAND and computes the SRES and session key $K_c$ according to the same authentication algorithm or key agreement algorithms (A3 or A8, respectively), using its secret key $K_i$. The calculated SRES value is sent to the base station, which can compare it to the SRES in the authentication triplet, thereby authenticating the subscriber station's validity. Once the subscriber station is authenticated, the $K_c$ may be used for encryption of communications during the active session, as directed by the base station.

Unfortunately, the A5 algorithms are susceptible to third party attacks, causing both the data and the network to be compromised. Generally speaking, encryption of data communicated on wireless systems is performed after coding for error correction. It is well-known that coding introduces known linear relationships between the bits to be encrypted. Thus, although an attacker might not know the actual values of individual input bits, they may know certain groups will XOR to zero, in accordance with the known linear relationships of coding. Such known relationships may allow attackers to break into secured communications without specific knowledge of the content of data being encrypted.

Such attacks are known as "ciphertext only" attacks, and have been demonstrated as effective against the various A5 encryption algorithms. One example of such an attack is a "Man In The Middle" attack (MITM) as disclosed by Biham et al. Basically, the MITM attack against GSM involves a false base station able to interject itself into the authentication process and intercept both the RAND and the SRES. The false base station forces the subscriber station to use the weaker A5/2 algorithm for encryption after authentication. Only a small amount of A5/2 encrypted communication is required in order for the false base station to break out the $K_c$ from the A5/2 traffic. At that point, the false base station may act as a translator between the A5/2 encryption on the leg between the subscriber station and the false base station, and whichever encryption is requested by the real base station on the leg between the false base station and the real base station. More importantly, the false base station is able to recover the entire authentication triplet, which may then be re-used, such as for hijacking phone calls or establishing false service. Further, although stronger A5 algorithms, such as A5/3, have been developed, since $K_c$ works with any of these algorithms, even the stronger ones are undermined by the security flaws in weaker algorithms allowing the $K_c$ to be intercepted in the first place.

Although proposals have been made for protecting against this type of attack, there is currently no effective solution that would not require significant changes to standard GSM protocols or equipment. Also, changes to SIMs and deployed subscriber stations may be impossible or impracticable to implement. Changes to the network infrastructure would also be cumbersome, costly, and difficult to synchronize. Thus, currently proposed solutions to the threat of these attacks may be too costly or impracticable to actually implement.

With reference now to FIG. 1 of the drawings, there is illustrated a portion of a typical GSM network system which may be compromised by an attacker. A user may communicate over the network by using a subscriber station 100, which may be or include a cellular phone, and a Subscriber Identity Module (SIM) card 104. Of course, it is to be understood that the teachings herein apply to various communications devices and are not limited to cellular phones. The SIM card 104 is a small piece of circuitry which may be placed within a cellular phone. The SIM card 104 may store personal information about a user, such as his phone number, secret key (explained in further detail below), phone book entries, and other details. Some of this information may be used so the user may be identified and authenticated to the network supplying the phone service. The SIM card 104 may also include processing capability, and encryption capability for voice and data transmissions before transmission from the subscriber station to the network. The SIM card 104 may optionally be moved from one device to another and/or different SIM cards 104 may be inserted into any GSM cellular phone. For example, if a user has one phone but uses it for both personal and business calls, he can change the SIM card depending on how he will be using the phone (one card contains his personal identity and data and the second card carries his business identity and data).

When a user powers up the subscriber station 100, it attempts to locate one or more Network Access Points (NAP) 106 to be used for communications. A NAP may include, for example, a base station or other hardware suitable for connecting to a GSM network. To do this, the subscriber station 100 monitors pilot signals sent from different NAPs. The subscriber station may choose the strongest pilot signals, which would identify one NAP as being suitable for establishing a link to the network. In the following description of the GSM network system, the subscriber station 100 establishes a link with one NAP 106.

After the subscriber station 100 is connected to the network via a link 108 established with the NAP 106, the network must determine the location of the subscriber station 100. A database such as a Visited Location Register (VLR) 112 may store an entry for every subscriber station in its local area, along with subscriber station's last known location. Subscriber stations may periodically inform their Home Location Register (HLR) 110 of their current location, allowing HLR 110 to update stored information accordingly and route incoming calls to the subscriber station. When a subscriber station is not roaming (i.e. when it is in the area served by its home operator), the functions of the HLR 110 and the VLR 112 may be combined. When used, the VLR 112 may be helpful for communicating between a subscriber station roaming in a foreign network and the subscriber station's own HLR 110 which is in the home network. It is to be understood that the concepts herein may be applied to wireless systems with and without VLRs.

After the network identifies the current location of the subscriber station 100, it may attempt to authenticate the user. Authentication is one part of GSM security measures. A user's secret key ($K_i$) is central to security in the GSM system, and one is used during authentication. Each user is assigned a random number as a secret key, referred to as $K_i$, stored in their SIM card 104 and in a database called the Authentication Center (AuC) 114. The secret key is carefully guarded as discovery by a third party would break down the system. The $K_i$ is never sent from the AuC 114, so it cannot be overheard in transmission. The $K_i$ also never leaves the SIM card 104. During authentication, the NAP 106 first asks the AuC 114 for a random number and an associated response. The AuC 114 includes a processor 116 which may generate the random number (RAND) and perform a security algorithm in which the RAND and the user's $K_i$ are used as inputs. The security algorithm may be in accordance with the A3/A8 authentication protocol, for example, though other protocols may be used as well. The outputs of this algorithm are the response (SRES) and a special encryption key, known as the session key ($K_c$). The SRES may be used to authenticate the user, and the $K_c$ may be used by both the subscriber station and the network to encrypt and decrypt communications data after authentication occurs.

After the AuC generates and calculates the RAND, SRES and $K_c$, it bundles the three values together in what is called an authentication triplet (triplet), and provides the triplet to the NAP 106. The NAP 106 then extracts the RAND from the triplet, and sends just the RAND to the subscriber station 100. The subscriber station 100 knows which authentication algorithms were used by the AuC to generate SRES and $K_c$. Thus, by using the same authentication algorithms, the subscriber station 100 may take the RAND received from the NAP and calculate the same SRES and $K_c$. As described above, these values are functions of $K_i$, the secret key stored on the SIM card 104 and available for use by the subscriber station 100.

Figure 2:
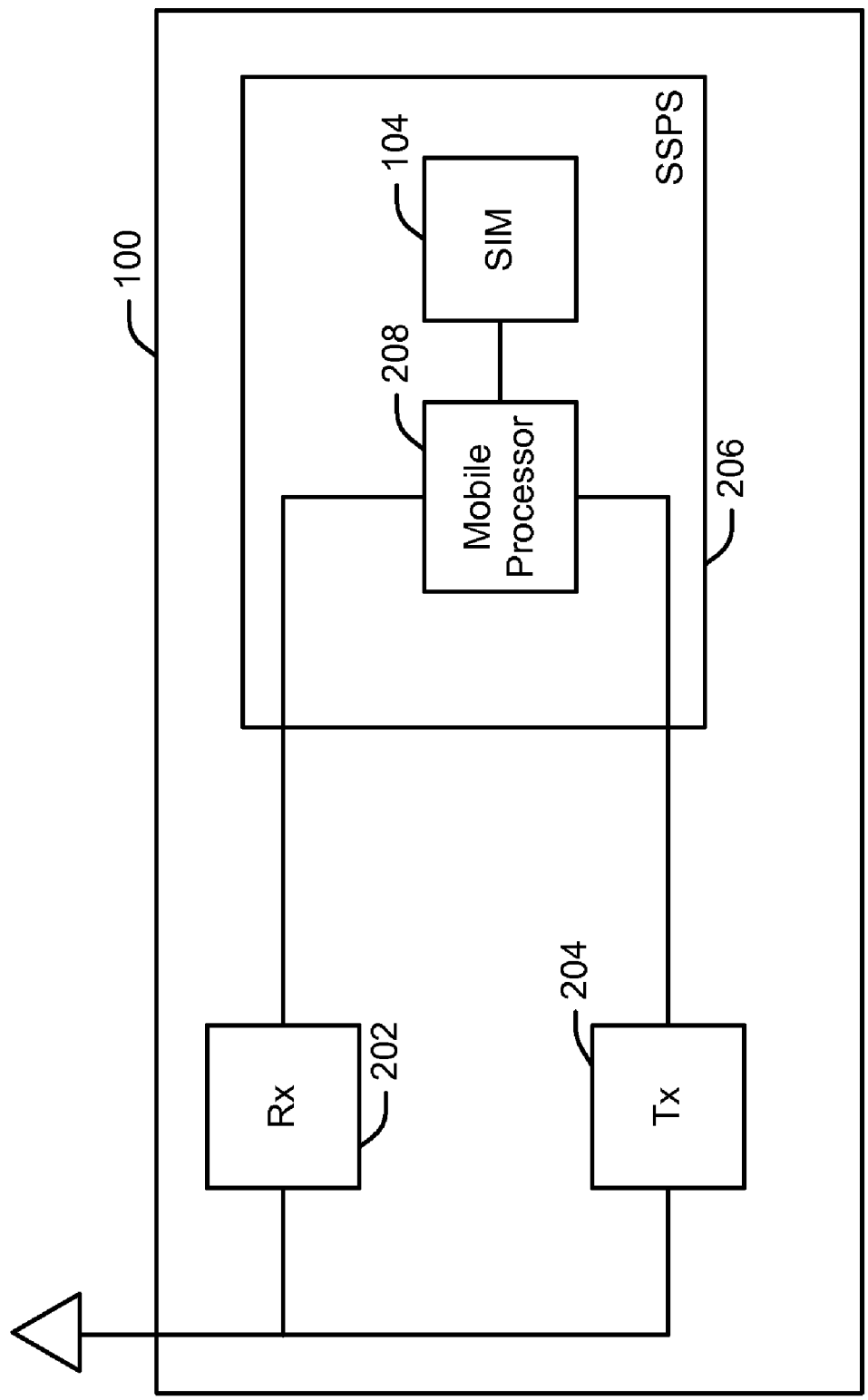
FIG. 2 illustrates components of a subscriber station that may be involved during authentication.

FIG. 2 illustrates additional components of the subscriber station 100 which may be involved during the authentication process. An analog front end may include a transceiver 200 having both a receiver 202 and a transmitter 204. The subscriber station 100 may also include a processing system 206 including a processor 208 resident on the user's cellular phone and the SIM card 104 which, as explained above, has its own processor.

Returning now to FIG. 1, once the subscriber station 100 (or its SIM card 104) calculates SRES and $K_c$, it can hold on to $K_c$ and send the SRES back to the NAP 106. If the NAP 106 is able to authenticate the subscriber station 100, then communications may proceed and each entity can use the $K_c$ to encrypt and decrypt communications data according to the encryption algorithm selected by the NAP and specified to the subscriber station 100. In order to authenticate the subscriber station 100, the NAP 106 first verifies the received the correct SRES is from the subscriber station 100. To do so, the NAP 106 may, via a processor 118, compare the SRES received from the subscriber station 100 and the SRES received from the AuC 114. If they do not match, then authentication fails. If they do match, however, then the subscriber is authenticated and communications may proceed.

As explained above, the MITM attack is conducted during the authentication procedure. When the NAP 106 sends a RAND to the subscriber station 100 for authentication, the RAND is intercepted by an attacker 120. The attacker 120 forwards the RAND to the legitimate user's subscriber station 100. The subscriber station 100, believing this authentication request legitimately comes from the NAP 106, computes the SRES as part of the normal authentication routine described above, and returns the SRES to the NAP 106. The SRES is again intercepted by the attacker 120, which forwards it on to the network. At this point, the attacker 120 appears "authenticated" to the NAP 106, and also has possession of both the RAND and the SRES, which it intercepted. The only part of a full authentication triplet the attacker 120 lacks is the $K_c$. However, the attacker 120 can use the weak encryption algorithm A5/2 to obtain this value.

For example, under normal conditions, when the NAP 106 verifies authentication, the NAP 106 sends a request for the subscriber station 100 to proceed with communications using A5/1 or A5/3 encryption (cipherstart message). During an attack, however, the attacker 120 can intercept the cipherstart message and, instead of forwarding it to the subscriber station 100, it changes the cipherstart message and instead tells the subscriber station 100 to use A5/2, the weak encryption algorithm. The A5/2 request appears to the subscriber station 100 to be a legitimate cipherstart message, so the subscriber station will begin encrypting its communications data with the A5/2 algorithm. The attacker 120, which is still intercepting communications between the NAP 106 and the subscriber station 100, may then employ cryptanalysis of A5/2 to retrieve the $K_c$. Once it knows $K_c$, the attacker 120 may act as a translator and communicate with the subscriber station 100 via A5/2 and communicate with the NAP 106 via whichever algorithm the NAP 106 specified in its cipherstart message, since the same $K_c$ works with any of the A5 algorithms. More importantly, at this point the attacker 120 has every piece of a valid authentication triplet, which it may then re-use for future sessions, such as to hijack phone calls or steal phone service by posing as an authenticated user.

Figure 3:
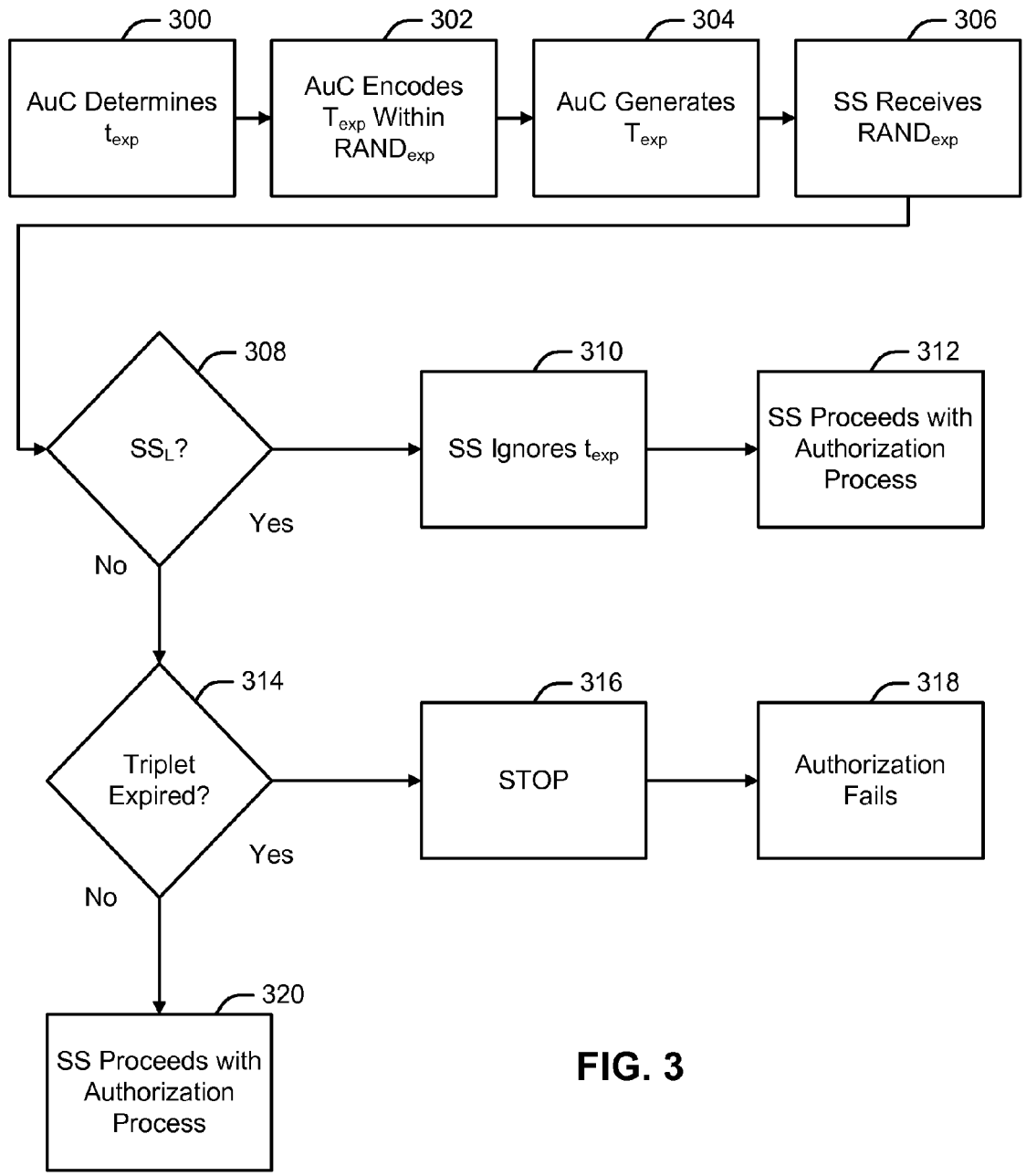
FIG. 3 is a flow diagram illustrating an example of implementing an expiration time in a triplet.

In order to prevent the potentially unlimited re-use of intercepted triplets, an expiration feature may be implemented. Triplets may be formulated to include additional information, causing their validity to expire after a certain predetermined time, $t_{exp}$. Such a feature may include encoding a time window or expiration time into a RAND, and may prevent an attacker from re-using intercepted authentication information for an unlimited period of time. FIG. 3 is a flow diagram illustrating an example of a method including a triplet having such an encoded expiration time. At block 300, $t_{exp}$ may be determined, for example by the AuC. Then at block 302, $t_{exp}$ may be encoded within the random value $RAND_{exp}$. $RAND_{exp}$ may also include the mandated encryption marker described above. Then, at block 304 the AuC may combine the $RAND_{exp}$ with corresponding SRES and $K_c$ values to form a triplet with $t_{exp}$. The triplet may be passed through the network as described above, and eventually the $RAND_{exp}$ may be extracted from the triplet and received by a subscriber station as indicated at block 306.

What occurs next may depend on whether the subscriber station comprises legacy or upgraded equipment, as indicated at block 308. If the subscriber station supports challenge expiration processing continues to step 314. Else processing continues to step 310. The system may fail to recognize $t_{exp}$, indicated at block 310. At block 312 the subscriber station may proceed with the authorization process described above, using $RAND_{exp}$ without accounting for $t_{exp}$ or making other changes to the process. If, however, the subscriber station is upgraded, it may recognize $t_{exp}$ and determine at decision block 314 whether $t_{exp}$ is greater than the current time, $t_{cur}$, which may be determined, for example, from the subscriber station's internal clock. In other words, the subscriber station may compare $t_{cur}$ to the time at which the triplet is no longer valid, $t_{exp}$. If the triplet is no longer valid, then at block 316 the subscriber station stops proceeding with $RAND_{exp}$, which it now knows to have been obtained from an expired and invalid triplet. As a result, authentication will fail at block 318. However, if $t_{cur}$ has not yet reached the time indicated by $t_{exp}$, then at block 320 the subscriber station knows that $RAND_{exp}$ came from a valid triplet, and it may use $RAND_{exp}$ to proceed with authorization as described above.

It is to be understood that $t_{exp}$ is not limited to being a single discrete time at which the triplet will expire, but may alternatively include a time window denoting a validity period. The time window may include upper and lower time bounds, outside of which the triplet encoded with this time window would be considered expired and invalid. For example, if $t_{cur}$ fell within the time window, the triplet would be valid, and if $t_{cur}$ fell outside of the time window, i.e. on either side of the upper and lower time bounds defining the time window, then the triplet would be expired and thus invalid.

Figure 4:
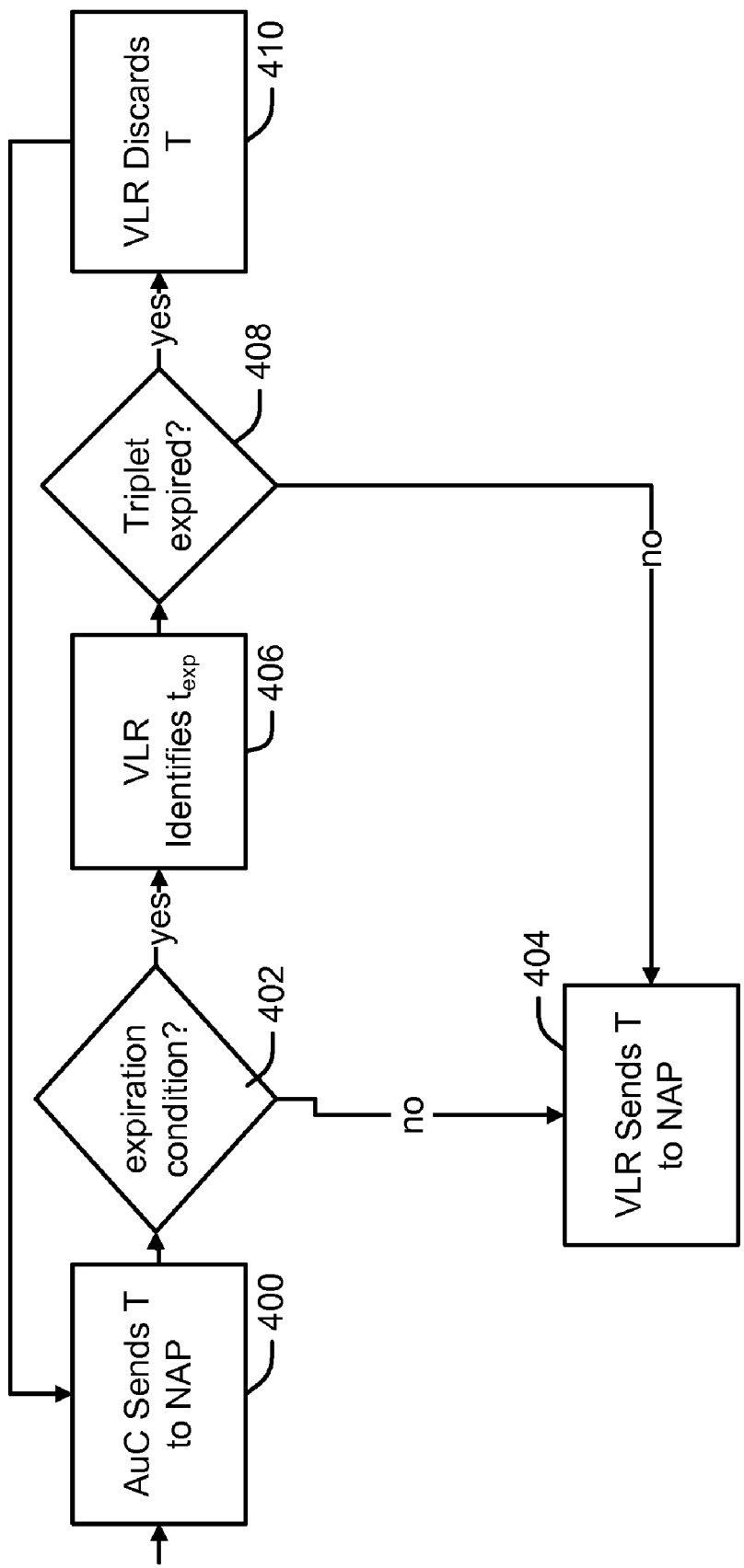
FIG. 4 is a flow diagram illustrating an example of handling an authentication triplet having an expiration time marker.

FIG. 4 is a flow diagram illustrating an example of handling an authentication triplet having an expiration time marker. At block 400, an AuC may select a triplet, T, for example in response to receiving a request for the triplet from a NAP during authentication, and send T to a VLR for possible use in authenticating a subscriber station. This, and other procedures described with reference to FIG. 4, may alternatively be performed by a HLR. At block 402, the NAP may test whether T is a triplet having a time window or other form of expiration marker encoded within it. If not, then the triplet is valid and at block 404 the VLR sends the triplet to the NAP for use in authentication. On the other hand, if T includes an expiration marker, then at block 406 the VLR may identify the marker $t_{exp}$, which may then be used to test T's current validity.

At block 408, the VLR may test whether the triplet has expired by comparing $t_{exp}$ with the current time, $t_{cur}$, which may be determined for example from the VLR's internal clock, and determining whether $t_{exp}$ exceeds $t_{cur}$. If it is determined that the triplet is expired, at block 410 the VLR may discard the triplet and select another, at block 400. If, on the other hand, the triplet is still valid, it may be sent to the NAP for use in authentication, at block 404. In another embodiment, the VLR may discard triplets prior to their actual expiration, such as within a certain amount of time prior to $t_{cur}$ exceeding $t_{exp}$. For example, a tolerance may be predefined and programmed within the VLR, such that when $t_{cur}$ is less than $t_{exp}$ but within the tolerance amount thereof, the VLR may still discard the triplet.

Figure 5:
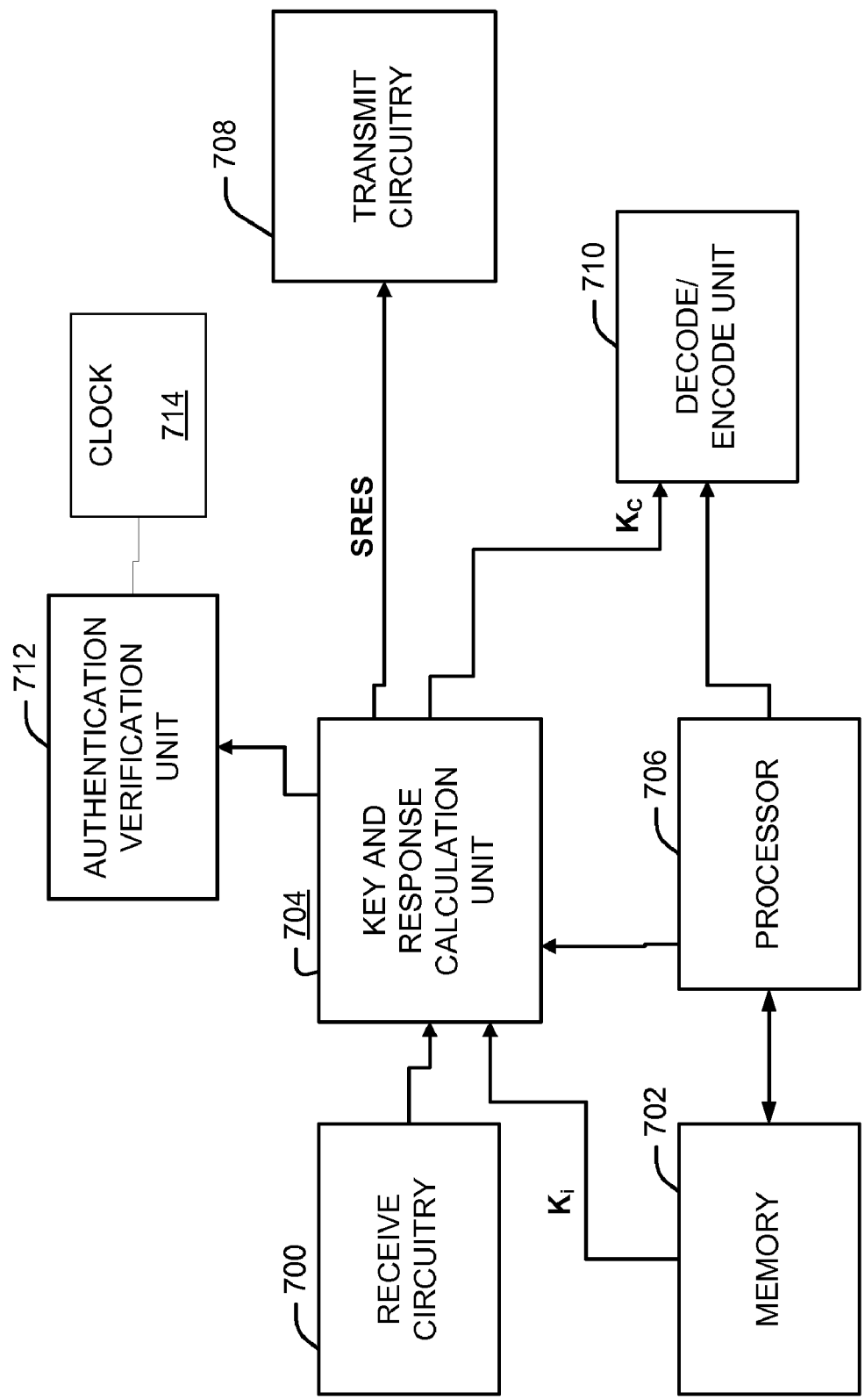
FIG. 5 illustrates a subscriber unit.

FIG. 5 illustrates a subscriber unit according to one embodiment, having an authentication verification unit 712 for comparing a current time to an expiration time associated with the random value, RAND. The subscriber unit has receive circuitry 700 coupled to a key and response calculation unit 704, which provides response, SRES, to transmit circuitry 708 and key, $K_c$, to encode/decode unit 710. A microprocessor controls operation of the key and response calculation unit 704, encode/decode unit 708, and memory storage unit 702. The subscriber unit stores the secret key, $K_i$, in memory storage unit 702. The key and response calculation unit 704 extracts the expiration time information from the random value, RAND, received from the network. The authentication verification unit 712 receives the expiration time information and makes a comparison with a current time. If the authentication verification unit 712 determines RAND has expired, the subscriber unit terminates the authentication procedure and may decide to retry. If the authentication verification unit 712 determines RAND has not expired, the subscriber unit generates the response, SRES, and key, $K_i$. The authentication verification unit 712 receives the timing information, such as current time, from clock 714.

While the specification describes particular embodiments of the present invention, those of ordinary skill can devise variations of the present invention without departing from the inventive concept. For example, the teachings herein refer to circuit-switched network elements but are equally applicable to packet-switched domain network elements. Also, the teachings herein are not limited to authentication triplet pairs but can also be applied to use of a single triplet that includes two SRES values (one of the customary format, and one of the newer format disclosed herein).

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the embodiments disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for secure wireless communications with a network at a subscriber station, comprising:
  receiving a random value from the network, the random value having an expiration marker denoting an expiration time;
  comparing a current time to the expiration time;
  authenticating the communication if the current time does not exceed the expiration time; and
  refusing authentication of the communication if the current time exceeds the expiration time;
  wherein the steps of receiving, comparing, authenticating, and refusing are performed at the subscriber station.

2. The method of claim 1, wherein the expiration time is defined by a window of time.

3. The method of claim 1, further comprising:
  retrieving a secret key stored in the subscriber station; and
  generating a response value as a function of the secret key and the random value.

4. The method of claim 3, further comprising:
  generating at the subscriber station an encryption key as a function of the secret key and the random value.

5. The method of claim 4, further comprising:
  transmitting from the subscriber station to the network the response value for authentication.

6. The method of claim 5, further comprising:
  encrypting data for transmission using the encryption key.

7. The method of claim 6, further comprising:
  decrypting received data using the encryption key.

8. A method as in claim 4, further comprising:
receiving at a network access point of the network an authentication triplet including the random value, the response value, and the encryption key, wherein the triplet identifies the expiration marker.

9. An apparatus for wireless communication, comprising:
means for receiving a random value from a network, the random value having an expiration marker denoting an expiration time;
means for comparing a current time to the expiration time;
means for authenticating the communication if the current time does not exceed the expiration time; and
means for refusing authentication of the communication if the current time exceeds the expiration time;
wherein the means for comparing resides in a subscriber station.

10. The apparatus of claim 9, wherein the expiration time is defined by a window of time.

11. The apparatus of claim 9, further comprising:
means for retrieving a secret key stored in the subscriber station; and
means for generating a response value as a function of the secret key and the random value.

12. The apparatus of claim 11, further comprising:
means for generating an encryption key as a function of the secret key and the random value.

13. The apparatus of claim 12, farther comprising:
means for transmitting the response value for authentication.

14. The apparatus of claim 13, farther comprising:
means for encrypting data for transmission using the encryption key.

15. The apparatus of claim 14, farther comprising:
means for decrypting received data using the encryption key.

16. The apparatus as in claim 12, further comprising:
means for receiving at the network an authentication triplet including the random value, the response value, and the encryption key, wherein the triplet identifies the expiration marker.

17. A network having an authentication center and a location register, the network comprising:
means for generating at the authentication center a random value having an expiration marker specifying an expiration time of an authentication triplet;
means for calculating a session key and a response value as a function of the random value at the authentication center;
means for combining the random value, the session key and the response value to form an authentication triplet at the authentication center, wherein the authentication triplet includes the expiration marker; and
means for transmitting the authentication triplet from the authentication center to the location register.

18. A subscriber station, comprising:
a receiver configured to receive a random value from a network, the random value having a marker denoting an expiration time;
a clock configured to report the current time; and
a processor configured to recognize the marker and, in response to recognizing the marker, compare the current time to the expiration time, and refuse authentication of the subscriber station if the current time exceeds the expiration time;
wherein the receiver, the clock, and the processor reside in the subscriber station.

19. The subscriber station of claim 18, wherein the processor is further configured to reject the random value for use in authentication when the current time is at least as great as the expiration time.

20. The subscriber station of claim 19 wherein the processor is further configured to use the random value for authentication when the current time is less than the expiration time.

* * * * *